(12) United States Patent
Wang et al.

(10) Patent No.: US 10,838,160 B2
(45) Date of Patent: Nov. 17, 2020

(54) OPTICAL FIBER CABLE WITH OPTICAL FIBER SENSING AND COMMUNICATION FUNCTIONS AND MANUFACTURING METHOD

(71) Applicant: NANJING WASIN FUJIKURA OPTICAL COMMUNICATION LTD., Nanjing (CN)

(72) Inventors: Xiaoquan Wang, Nanjing (CN); Haibo Wu, Nanjing (CN); Chenglong Zhang, Nanjing (CN); Guo Zhao, Nanjing (CN)

(73) Assignee: NANJING WASIN FUJIKURA OPTICAL COMMUNICATION LTD., Nanjing (CN)

( * ) Notice: Subject to any disclaimer, the term of this patent is extended or adjusted under 35 U.S.C. 154(b) by 0 days.

(21) Appl. No.: 16/613,120

(22) PCT Filed: Jul. 21, 2017

(86) PCT No.: PCT/CN2017/093842
§ 371 (c)(1),
(2) Date: Nov. 13, 2019

(87) PCT Pub. No.: WO2018/223499
PCT Pub. Date: Dec. 13, 2018

(65) Prior Publication Data
US 2020/0096718 A1    Mar. 26, 2020

(30) Foreign Application Priority Data

Jun. 9, 2017    (CN) .......................... 2017 1 0434145

(51) Int. Cl.
*G02B 6/44*    (2006.01)

(52) U.S. Cl.
CPC ......... *G02B 6/4432* (2013.01); *G02B 6/4479* (2013.01); *G02B 6/4494* (2013.01)

(58) Field of Classification Search
CPC .................................................... G02B 6/4432
See application file for complete search history.

(56) References Cited

U.S. PATENT DOCUMENTS

| 9,188,754 B1* | 11/2015 | Risch | ................... | G02B 6/4401 |
| 2008/0122617 A1 | 5/2008 | Browning et al. | | |
| 2017/0261716 A1* | 9/2017 | Thompson | ........... | G02B 6/4471 |

FOREIGN PATENT DOCUMENTS

| CN | 1609645 A | 4/2005 |
| CN | 2800301 Y | 7/2006 |

(Continued)

*Primary Examiner* — Sung H Pak
(74) *Attorney, Agent, or Firm* — Bayramoglu Law Offices LLC

(57) ABSTRACT

An optical fiber cable with optical fiber sensing and communication functions includes an outer sheath layer, an inner sheath layer, communicating optical fibers, and sensing optical fibers. The communicating optical fibers are laid inside the inner sheath layer, the sensing optical fibers are laid between the inner sheath layer and the outer sheath layer, and an inner reinforcing member is filled in the inner sheath layer. An outer reinforcing member-is filled between the inner sheath layer and the outer sheath layer, and a plurality of cutting kerfs for slotting are provided on an outer side wall of the outer sheath layer along a length direction of the outer sheath layer. A manufacturing method includes processes of cable paying-off, molding, extruding to form sheath layers, making cutting kerfs, cooling and cable taking-up, etc., which has simple operation and low production costs.

15 Claims, 4 Drawing Sheets

(56) References Cited

FOREIGN PATENT DOCUMENTS

| CN | 101943782 A |   | 1/2011 |
|----|-------------|---|--------|
| CN | 102012285 A |   | 4/2011 |
| CN | 104503056 A |   | 4/2015 |
| CN | 105044864 A | * | 11/2015 |
| CN | 105044864 A |   | 11/2015 |
| CN | 105093450 A |   | 11/2015 |
| CN | 106683305 A |   | 5/2017 |
| JP | 108222042 A |   | 8/1996 |

* cited by examiner

ОPTICAL FIBER CABLE WITH OPTICAL FIBER SENSING AND COMMUNICATION FUNCTIONS AND MANUFACTURING METHOD

CROSS REFERENCE TO THE RELATED APPLICATIONS

This application is the national phase entry of International Application No. PCT/CN2017/093842, filed on Jul. 21, 2017, which is based upon and claims priority to Chinese Patent Application No. 201710434145.6, filed on Jun. 9, 2017, the entire contents of which are incorporated herein by reference.

TECHNICAL FIELD

The present invention relates to an optical fiber sensing cable, and more specifically to an optical fiber cable with optical fiber sensing and communication functions, and a manufacturing method thereof.

BACKGROUND

Compared with traditional sensors, an optical fiber sensor, using light as a carrier for sensitive information and an optical fiber as a medium for transmitting the sensitive information, has the functions of an optical fiber and optical measurement. The optical sensor has a series of distinctive advantages such as good electrical insulation performance, strong anti-electromagnetic interference capability, is non-invasive, high sensitivity, convenient remote monitoring of the signal to be detected, corrosion resistance, explosion proof, flexible optical path, easy connection with a computer, etc.

As sensors are becoming more sensitive, accurate, well-adapted, compact, and intelligent, they can not only act as human eyes or ears in places where humans cannot reach (such as high temperature areas, or areas harmful to humans such as nuclear radiation areas), but also receive outside information that is not able to be felt by human senses and beyond human physiological limits. Therefore, optical fiber sensors have garnered more and more attention. Since the $20^{th}$ century, optical fiber sensors have been widely used, and thus various kinds of optical fiber sensing cables, such as distributed optical fiber sensing cables, have been provided. After the optical fiber cables are made, the manufacturers need to make slots on the optical fiber sensing cables at intervals as required, allowing the optical fiber sensors to directly contact the objects which are to be detected, thereby improving the accuracy of the optical fiber sensing. However, making slots on the optical fiber sensing cables manually is difficult and costly, and reduces the performance of the optical fiber sensing cables to some extent. Therefore, there is an urgent need to improve the structure of the existing optical fiber sensing cable to ensure a convenient slotting, reducing processing costs and improving sensing performance thereof.

SUMMARY

The objective of the present invention is to provide an optical fiber cable with optical fiber sensing and communication functions. The optical fiber cable has an ingenious structure, which not only achieves an optical transmission, but also ensures an accuracy of the optical fiber sensing. Meanwhile, a slotting operation is convenient, and the processing cost is effectively reduced. In addition, a method for manufacturing the optical fiber sensing cable is further provided, which is simple in operation and high in production efficiency and accuracy.

In order to achieve the above objective, the technical solution provided by the present invention is as follows. An optical fiber cable with optical fiber sensing and communication functions includes an outer sheath layer, an inner sheath layer, communicating optical fibers, and sensing optical fibers. The communicating optical fibers are laid inside the inner sheath layer. The sensing optical fibers are laid between the inner sheath layer and the outer sheath layer. An inner reinforcing member is filled in the inner sheath layer. An outer reinforcing member is filled between the inner sheath layer and the outer sheath layer and a plurality of cutting kerfs for slotting are provided on an outer side wall of the outer sheath layer along a length direction of the outer sheath layer.

As an improvement of the present invention, a cutting thickness of each of the plurality of cutting kerfs is slightly less than ⅔-¾ of a thickness of the outer sheath layer.

As an improvement of the present invention, the communicating optical fibers are at least one kind selected from individual optical fibers, tight-buffered optical fibers, optical fiber ribbons, and optical fiber bundles. The number of the communicating optical fibers is 2-200. The sensing optical fibers are tight-buffered optical fibers and the number of the sensing optical fibers is 2-16.

As an improvement of the present invention, the inner sheath layer is made of a low-smoke halogen-free material, and the outer sheath layer is made of polyethylene.

As an improvement of the present invention, the inner reinforcing member is made of a water-blocking reinforcing material, and the outer reinforcing member is made of a non-metallic reinforcing material. Specifically, the inner reinforcing member and the outer reinforcing member may be at least one selected from the group consisting of aramid yarn, polyethylene yarn, glass fiber yarn or fiber reinforced plastic (FRP) belt.

The present invention further provides a method for preparing the above optical fiber cable. A production line used for the method includes a wire pay-off device, a die device, an extrusion device, a cutting device, a cold water tank, a wire take-up device, and a length measurer. The method includes drawing optical fibers of the communicating optical fibers to the die device through the wire pay-off device to prepare formed communicating optical fibers. Filling a gap between the communicating optical fibers with the inner reinforcing member, and then extruding to obtain one inner sheath layer by the extrusion device to form a first-level cable core. Passing the first-level cable core through a center hole of a wire distributing turntable of the wire pay-off device, and passing a plurality of pre-coated optical fibers forming the sensing optical fibers through a distributing hole of the wire distributing turntable of the wire pay-off device to wrap around the first-level cable core to form a second-level cable core. Filling the second-level cable core with the outer reinforcing member, and then extruding to obtain one outer sheath layer by the extrusion device to form the optical fiber cable. Cutting an outer side wall of the outer sheath layer of the optical fiber cable at a predetermined interval by the cutting device to form the cutting kerfs. Cooling the optical fiber cable with the cutting kerfs by the cold water tank, and taking-up the optical fiber cable after being cooled by the wire take-up device while measuring a length of the optical fiber cable by the length measurer.

As an improvement of the present invention, the cutting device includes a cutting tool, a driving motor, a movable supporting arm, a supporting base, a cabinet, and a cutting controller. The cutting tool is fixedly mounted on one end of the movable supporting arm, and the other end of the movable supporting arm is connected to an output shaft of the driving motor through a coupling. The movable supporting arm is rotatably mounted on the supporting base through a fulcrum. The driving motor and the supporting base are fixedly provided on the cabinet. The cutting controller is provided in the cabinet, and the driving motor and the length measurer are electrically connected to the cutting controller.

As an improvement of the present invention, the cutting tool has a circular shape. The cutting tool includes two semicircular cutting blades, and cutting edges are provided at an inner side and two ends of each of the two cutting blades.

As an improvement of the present invention, the movable supporting arm includes an upper supporting arm and a lower supporting arm. The cutting blades are fixedly mounted on the upper supporting arm and the lower supporting arm, respectively, and the cutting edges of the two cutting blades are provided opposite to each other.

Compared with the prior art, the optical fiber sensing cable with the optical fiber sensing and communication functions provided by the present invention has an ingenious overall structure, possessing the optical fiber sensing and communication functions, and has low cost. For the optical fiber cable, an all-dry type structure is used to ensure environmental protection in the subsequent processing of the optical fiber cable. Also, a double-sheath design is used to ensure minimizing the damage to the performance of the communicating optical fibers in the inner sheath layer when connecting the optical fiber sensor. Moreover, the cutting kerfs are directly provided on the outer sheath layer, which greatly facilitates the subsequent slotting without affecting the performance of the sensing optical fibers, and effectively reduces costs. In addition, the sensing optical fibers employ the nylon tight-buffered optical fibers to ensure the service life of the optical fiber cables. The method for manufacturing the optical fiber cable has the advantages of simple process, simple operation, low cost, high production efficiency, etc., and is convenient for modifying the production line of the existing optical fiber cable. The method has a wide range of applications.

In the figures: 1—outer sheath layer, 2—inner sheath layer, 3—communicating optical fibers, 4—sensing optical fibers, 5—innter reinforcing member, 6—outer reinforcing member, 7—cutting kerf, 8—wire pay-off device, 9—die device, 10—extrusion device, 11—cutting device, 12—cold water tank, 13—wire take-up device, 14—length measurer, 15—cutting tool, 16—driving motor, 17—movable supporting arm, 18—supporting base, and 19—cabinet.

DETAILED DESCRIPTION OF THE EMBODIMENTS

In order to promote awareness and understanding of the present invention, the present invention is further described and introduced with reference to the accompanying drawings.

Figure 1:
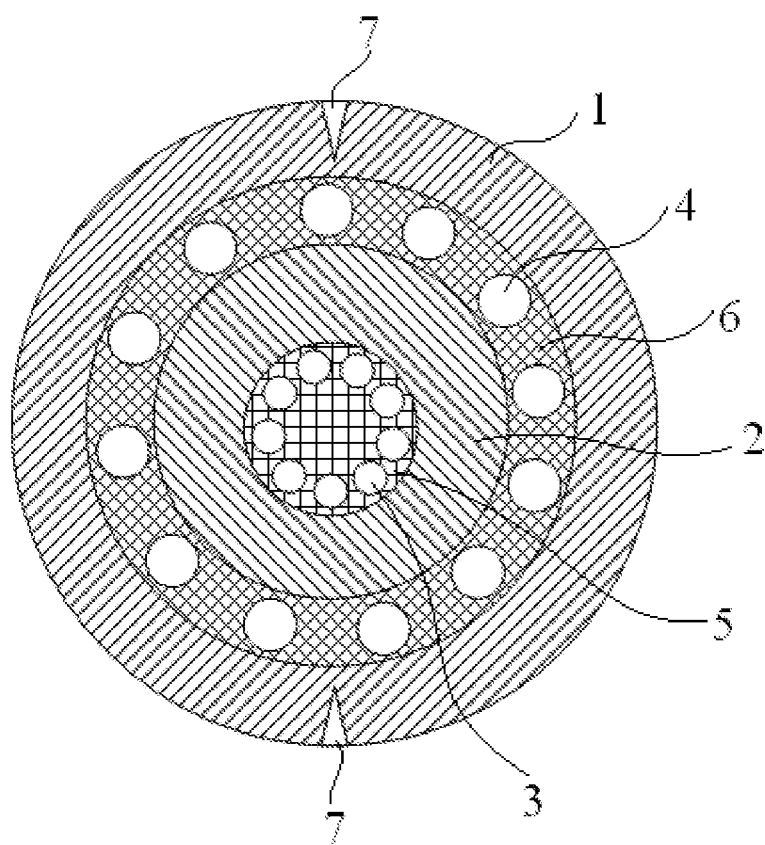
FIG. 1 is a schematic cross-sectional view of an optical fiber cable of the present invention.
Figure 2:
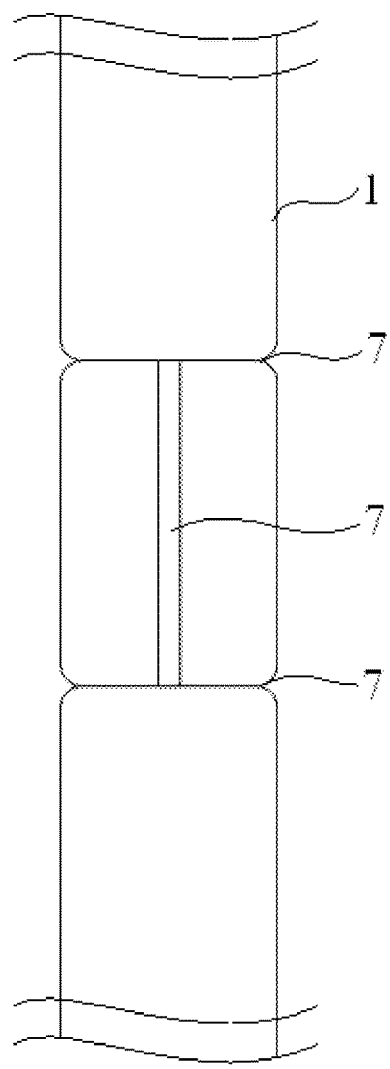
FIG. 2 is a schematic view showing a structure of an optical fiber cable of the present invention.

As shown in FIGS. 1-2, an optical fiber cable with optical fiber sensing and communication functions includes the outer sheath layer 1, the inner sheath layer 2, the communicating optical fibers 3, and the sensing optical fibers 4. The communicating optical fibers 3 are laid inside the inner sheath layer 2. The communicating optical fibers 3 are configured to realize the communication function of the optical fiber cable. The inner sheath layer 2 is filled with the inner reinforcing member 5, and the inner reinforcing member 5 can support the communicating optical fibers 3. The sensing optical fibers 4 are laid between the inner sheath layer 2 and the outer sheath layer 1. The sensing optical fibers 4 are configured to realize the sensing function of the optical fiber cable. The outer reinforcing member 6 is filled between the inner sheath layer 2 and the outer sheath layer 1, and the outer reinforcing member 6 can provide good protection and buffering effects on the sensing optical fibers 4. A plurality of cutting kerfs 7 for slotting are provided on an outer side wall of the outer sheath layer 1 along a length direction of the outer sheath layer 1. A length of an interval between the plurality of cutting kerfs 7 can be controlled by the length measurer 14 on a production line of the optical fiber cable, thereby meeting a user's differing requirements. In the subsequent process of slotting, a connection between an optical fiber sensor and the sensing optical fibers 4 can be realized by stripping the outer sheath layer 1 of the optical fiber cable along gaps of the cutting kerfs 7, which effectively reduces the difficulty and cost of the slotting.

Specifically, a cutting thickness of each of the plurality of cutting kerfs 7 provided outside the outer sheath layer 1 of the optical fiber cable is slightly less than ⅔-¾ of a thickness of the outer sheath layer 1, thereby effectively preventing the sensing optical fibers 4 located inside the outer sheath layer 1 from being exposed during a wire take-up process, and making the gaps of the cutting kerfs 7 obvious as well to facilitate to strip off of the outer sheath layer 1 of the optical fiber cable during the subsequent process of slotting.

The communicating optical fibers 3 are at least one kind selected from individual optical fibers, tight-buffered optical fibers, optical fiber ribbons, and optical fiber bundles. The number of the communicating optical fibers is 2-200. In addition, the communicating optical fibers 3 have no requirement on an arrangement of the optical fibers, and generally employ G652 fiber or G655 fiber.

The sensing optical fibers 4 are tight-buffered optical fibers and the number of the sensing optical fibers is 2-16. Specifically, the number of the optical fibers is selected according to the requirements of optical fiber sensing. The sensing optical fibers 4 are preferably tight-buffered optical fibers. The nylon tight-buffered optical fiber has a waterproof function, which can effectively ensure the sealing performance of the optical fiber cable after slotting and packaging, and does not affect the sensing performance of the sensing optical fiber 4.

The inner sheath layer 2 is made of a low-smoke halogen-free material. Specifically, a low-smoke halogen-free inner sheath can be used. The outer sheath layer 1 is made of polyethylene, specifically, a polyethylene sheath is used.

The inner reinforcing member 5 is made of a water-blocking reinforcing material, and the outer reinforcing member 6 is made of a non-metallic reinforcing material. Preferably, a water-blocking non-metallic reinforcing material is used. Therefore, the inner reinforcing member 5 and the outer reinforcing member 6 may be at least one selected from the group consisting of aramid yarn, polyethylene yarn, glass fiber yarn or fiber reinforced plastic (FRP) belt.

In summary, for the optical fiber cable in the present invention, an all-dry type structure is used to ensure environmental protection in the subsequent processing of the optical fiber cable. Also, a double-sheath design of the outer sheath layer 1 and the inner sheath layer is used to ensure minimizing the damage to the performance of the communicating optical fibers 3 in the inner sheath layer 2 when connecting the optical fiber sensor. Moreover, the cutting kerfs 7 are directly provided on the outer sheath layer 1, which greatly facilitates the subsequent slotting without affecting the performance of the sensing optical fibers 4, and effectively reduces costs.

Figure 3:
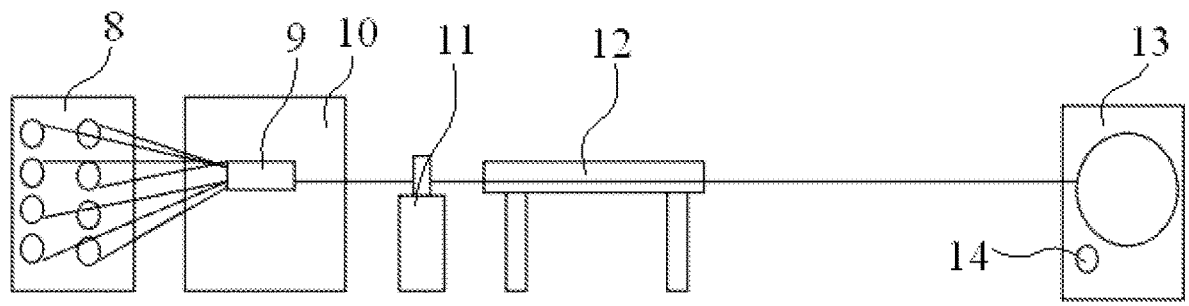
FIG. 3 is a structural schematic diagram of a production line for manufacturing an optical fiber cable of the present invention.

Further, the present invention provides a method for preparing the above optical fiber cable with the optical fiber sensing and communication functions, as shown in FIG. 3. A production line used in the method includes the wire pay-off device 8, the die device 9, the extrusion device 10, the cutting device 11, the cold water tank 12, the wire take-up device 13, and the length measurer 14, wherein respective two sets of the wire pay-off device 8, the die device 9 and the plastic extrusion device 10 are provided, and respective one set of the cutting device 11, the cold water tank 12, the wire take-up device 13, and the length measurer 14 is provided. The manufacturing method includes processes of cable paying-off, molding, extruding to form sheath layers, making the cutting kerfs 7, cooling and cable taking-up, etc. Specifically, the optical fibers of the communicating optical fibers 3 are drawn to the die device 9 through the wire pay-off device 8 to prepare the formed communicating optical fibers 3. A gap between the communicating optical fibers 3 is filled with the inner reinforcing member 5, and then an extrusion is performed to obtain one inner sheath layer 2 by the extrusion device 10 to form a first-level cable core. The first-level cable core passes through a center hole of a wire distributing turntable, and a plurality of pre-coated optical fibers forming the sensing optical fibers 4 pass through a distributing hole of the wire distributing turntable to wrap around the first-level cable core to form a second-level cable core. The second-level cable core is filled with the outer reinforcing member 6, and then an extrusion is performed to obtain one outer sheath layer 1 by the extrusion device 10 to form the optical fiber cable. The cutting kerfs 7 are formed by cutting an outer side wall of the outer sheath layer 1 of the optical fiber cable at a predetermined interval by the cutting device 11. The optical fiber cable with the cutting kerfs 7 is cooled by the cold water tank 12, and the optical fiber cable is taken up by the wire take-up device 13 after being cooled, while a length of the optical fiber cable is measured by the length measurer 14.

Figure 4:
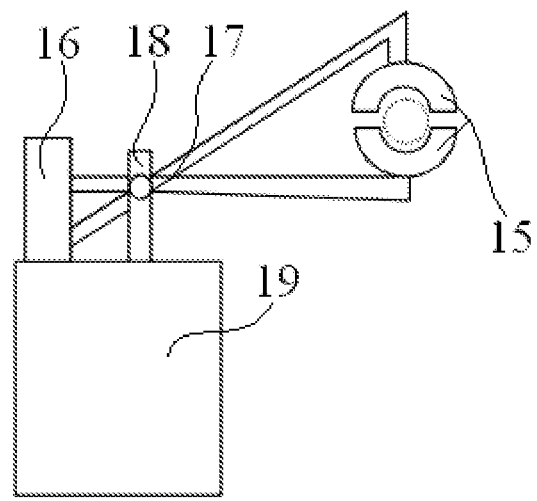
FIG. 4 is a structural schematic diagram of a cutting device of the present invention.
Figure 5:
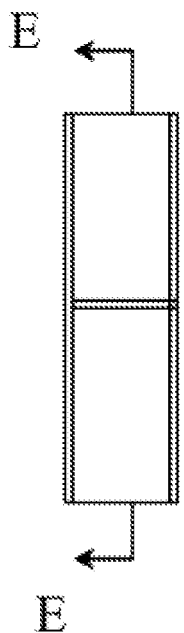
FIG. 5 is a side view showing a structure of a cutting tool of the present invention.
Figure 6:
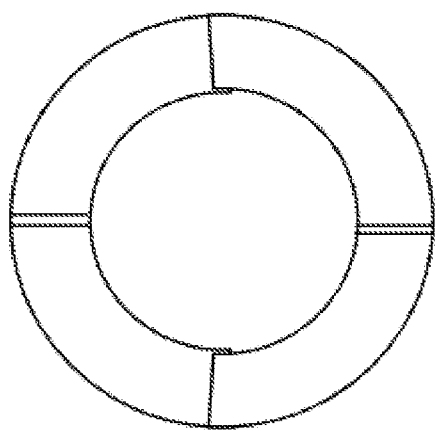
FIG. 6 is a cross-sectional view on the E direction in FIG. 5.

As shown in FIGS. 4-6, the cutting device 11 in the production line includes the cutting tool 15, the driving motor 16, the movable supporting arm 17, the supporting base 18, the cabinet 19, and a cutting controller. The cutting tool 15 is fixedly mounted on one end of the movable supporting arm 17, and the other end of the movable supporting arm 17 is connected to an output shaft of the driving motor 16 through a coupling. The movable supporting arm 17 is rotatably mounted on the supporting base 18 through a fulcrum. The driving motor 16 and the supporting base 18 are fixedly provided on the cabinet 19. The cutting controller is provided in the cabinet 19. The driving motor 16 and the length measurer 14 are electrically connected to the cutting controller. During use, the driving motor 16 is controlled by the cutting controller to drive the movable supporting arm 17 to control the cutting tool 15 to move up and down, thereby performing the cutting operation for the cutting kerfs 7 on the optical fiber cable passing through the cutting tool 15, wherein a cutting depth of the cutting kerf 7 is controlled by adjusting an amplitude of the up and down movement of the cutting tool 15, and a cutting length of the cutting kerf 7 in a length direction of the optical fiber cable is controlled by the data fed back to the cutting controller by the length measurer 14.

Further, the cutting tool 15 has a circular shape, thereby better contacting and cutting the optical fiber cable. The cutting tool 15 includes two semicircular cutting blades, and cutting edges are provided at an inner side and two ends of the cutting blade. The cutting tool 15 is formed by matching the two semicircular cutting blades, which can effectively improve the adaptability of the cutting tool 15 to different sizes of optical fiber cables and can also improve the cutting precision and cutting efficiency of the cutting tool 15 to optical fiber cables. The movable supporting arm 17 includes an upper supporting arm and a lower supporting arm. The cutting blades are fixedly mounted on the upper supporting arm and the lower supporting arm, respectively, and the cutting edges of the two cutting blades are provided opposite to each other.

The method for manufacturing the above optical fiber cable with the optical fiber sensing and communication functions disclosed by the present invention has the advantages of a simple process, simple operation, low cost, high production efficiency, etc., and is convenient for modifying the production line of the existing optical fiber cable The method has a wide range of applications.

The technical means disclosed in the solution of the present invention is not limited to the technical means disclosed in the above embodiments, and includes a technical solution composed of any combination of the above technical features. It should be noted that a number of improvements and modifications may be made by those skilled in the art without departing from the principles of the present invention, and such improvements and modifications are also considered to be within the protective scope of the present invention.

What is claimed is:

1. An optical fiber cable with optical fiber sensing and communication functions, comprising: an outer sheath layer, an inner sheath layer, communicating optical fibers, and sensing optical fibers;

wherein, an inner reinforcing member is adjacent to and in contact with the inner sheath layer and the communicating optical fibers are positioned within the inner reinforcing member, the inner sheath layer is adjacent to and in contact with an outer reinforcing member and the sensing optical fibers are positioned within the outer reinforcing member, the outer sheath layer is adjacent to and in contact with the outer reinforcing member, and a plurality of cutting kerfs for slotting are provided on an outer side wall of the outer sheath layer along a length direction of the outer sheath layer.

2. The optical fiber cable with the optical fiber sensing and communication functions of claim 1, wherein, a cutting thickness of each of the plurality of cutting kerfs is equal to ⅔-¾ of a thickness of the outer sheath layer.

3. The optical fiber cable with the optical fiber sensing and communication functions of claim 2, wherein, the communicating optical fibers are at least one kind selected from individual optical fibers, tight-buffered optical fibers, optical fiber ribbons, and optical fiber bundles, and a number of the communicating optical fibers is 2-200; the sensing optical fibers are tight-buffered optical fibers and a number of the sensing optical fibers is 2-16.

4. The optical fiber cable with the optical fiber sensing and communication functions of claim 3, wherein, the inner sheath layer is made of a low-smoke halogen-free material, and the outer sheath layer is made of polyethylene.

5. The optical fiber cable with the optical fiber sensing and communication functions of claim 4, wherein, the inner reinforcing member is made of a water-blocking reinforcing material, and the outer reinforcing member is made of a non-metallic reinforcing material.

6. The optical fiber cable with the optical fiber sensing and communication functions of claim 5, wherein, the inner reinforcing member and the outer reinforcing member are respectively at least one selected from the group consisting of an aramid yarn, a polyethylene yarn, a glass fiber yarn and a fiber reinforced plastic (FRP) belt.

7. A method for preparing the optical fiber cable with the optical fiber sensing and communication functions of claim 1, wherein, a production line used in the method comprises a wire pay-off device, a die device, an extrusion device, a cutting device, a cold water tank, a wire take-up device, and a length measurer, and the method comprises:

drawing optical fibers of the communicating optical fibers to the die device through the wire pay-off device to prepare formed communicating optical fibers;

filling a gap between the communicating optical fibers with the inner reinforcing member, and then extruding to obtain one inner sheath layer by the extrusion device to form a first-level cable core;

passing the first-level cable core through a center hole of a wire distributing turntable of the wire pay off device, and passing a plurality of pre-coated optical fibers forming the sensing optical fibers through a distributing hole of the wire distributing turntable to wrap around the first-level cable core to form a second-level cable core;

filling the second-level cable core with the outer reinforcing member, and then extruding to obtain one outer sheath layer by the extrusion device to form the optical fiber cable;

cutting an outer side wall of the outer sheath layer of the optical fiber cable at a predetermined interval by the cutting device to form the cutting kerfs; and cooling the optical fiber cable with the cutting kerfs by the cold water tank, and taking up the optical fiber cable after being cooled by the wire take-up device while measuring a length of the optical fiber cable by the length measurer.

8. The method for preparing the optical fiber cable with the optical fiber sensing and communication functions of claim 7, wherein, the cutting device includes a cutting tool, a driving motor, a movable supporting arm, a supporting base, a cabinet, and a cutting controller, the cutting tool is fixedly mounted on one end of the movable supporting arm, and the other end of the movable supporting arm is connected to an output shaft of the driving motor through a coupling, and the movable supporting arm is rotatably mounted on the supporting base through a fulcrum, the driving motor and the supporting base are fixedly provided on the cabinet, the cutting controller is provided in the cabinet, and the driving motor and the length measurer are electrically connected to the cutting controller.

9. The method for preparing the optical fiber cable with the optical fiber sensing and communication functions of claim 8, wherein, the cutting tool has a circular shape, and the cutting tool includes two semicircular cutting blades, and cutting edges are provided at an inner side and two ends of each of the two cutting blades.

10. The method for preparing the optical fiber cable with the optical fiber sensing and communication functions of claim 9, wherein, the movable supporting arm includes an upper supporting arm and a lower supporting arm, the cutting blades are fixedly mounted on the upper supporting arm and the lower supporting arm, respectively, and the cutting edges of the two cutting blades are provided opposite to each other.

11. The method of claim 7, wherein, a cutting thickness of each of the plurality of cutting kerfs is less than ¾ of a thickness of the outer sheath layer.

12. The method of claim 11, wherein, the communicating optical fibers are at least one kind selected from individual optical fibers, tight-buffered optical fibers, optical fiber ribbons, and optical fiber bundles, and a number of the communicating optical fibers is 2-200; the sensing optical fibers are tight-buffered optical fibers and a number of the sensing optical fibers is 2-16.

13. The method of claim 12, wherein, the inner sheath layer is made of a low-smoke halogen-free material, and the outer sheath layer is made of polyethylene.

14. The method of claim 13, wherein the outer reinforcing member is made of a non-metallic reinforcing material.

15. The method of claim 13, wherein, the inner reinforcing member and the outer reinforcing member are respectively at least one selected from the group consisting of an aramid yarn, a polyethylene yarn, a glass fiber yarn and a fiber reinforced plastic (FRP) belt.

* * * * *